Patented Oct. 31, 1950

2,528,355

UNITED STATES PATENT OFFICE 2,528,355

HALOGENATED XENYL TRICHLOROSILANES

Herbert J. Fletcher and Harry D. Dingman, Midland, Mich., assignors to Dow Corning Corporation, Midland, Mich., a corporation of Michigan No Drawing. Application September 14, 1949, Serial No. 115,781

4 Claims. (Cl. 260—448.2)

This invention relates to chloroxenylchlorosilanes.

The present invention relates to compounds of the type $C_{12}H_{(9-n)}Cl_nSiCl_3$ where $n$ has a value of from 4 to 7 inclusive.

The above halogenated xenylchlorosilanes are best prepared by direct halogenation of xenyltrichlorosilane. Preferably the halogenation is carried out by passing the halogen through xenyltrichlorosilane in the presence of iron or salts thereof. Preferably the catalyst is $FeCl_3$ in amount of 0.1 percent by weight of the silane. The reaction may be carried out at temperatures from 30 to 200° C. although these limitations are by no means critical.

Xenyltrichlorosilane used as a starting material in the preparation of compounds of this invention may be prepared by reacting biphenyl with trichlorosilane in the presence of aluminum chloride or boron trichloride at a temperature of 250° C. to 400° C. and under superatmospheric pressure.

The halogenated xenyltrichlorosilanes of this invention are used in the preparation of polysiloxane lubricants. Such lubricants are more completely described in the copending application of Herbert J. Fletcher and Melvin J. Hunter filed concurrently herewith.

In this application the term xenyl is used to designate the radical $C_6H_5C_6H_4$—which is also known as the diphenyl radical.

The following example is illustrative of the materials of this invention.

Example 539 g. of xenyltrichlorosilane was mixed with 0.54 g. of anhydrous $FeCl_3$ and chlorine gas was passed through the silane at a temperature of 50° C. to 80° C. until it had gained 273 g. in weight thus showing that four chlorine atoms had been absorbed per xenyl radical. A sample of the material was removed and analysis showed it to be tetrachloroxenyltrichlorosilane.

Chlorination of the product was continued until the weight gained by the mixture showed that six chlorines per xenyl radical has been adsorbed. A sample of the product was then removed and shown by analysis to be hexachloroxenyltrichlorosilane.

More chlorine was passed through the material and the mixture was heated at 80° C. to 150° C. until the weight gained showed that seven chlorines had been adsorbed per xenyl radical. Analysis of the residue showed that the material was heptachloroxenyltrichlorosilane.

That which is claimed is:
1. $C_{12}H_{(9-n)}Cl_nSiCl_3$ where $n$ has a value from 4 to 7 inclusive.
2. Tetrachloroxenyltrichlorosilane.
3. Hexachloroxenyltrichlorosilane.
4. Heptachloroxenyltrichlorosilane.

HERBERT J. FLETCHER.
HARRY D. DINGMAN.

No references cited.